No. 620,637. Patented Mar. 7, 1899.
H. BOHLS.
WRAPPING MACHINE.
(Application filed Apr. 28, 1896.)
(No Model.) 9 Sheets—Sheet 1.

Witnesses:
Arthur Garner
S. P. Hollingsworth

Inventor:
Henry Bohls,
by G. H. W. T. H. Ward, attys

No. 620,637. Patented Mar. 7, 1899.
H. BOHLS.
WRAPPING MACHINE.
(Application filed Apr. 28, 1896.)
(No Model.) 9 Sheets—Sheet 2.

Witnesses: Inventor;
Henry Bohls,

No. 620,637. Patented Mar. 7, 1899.
H. BOHLS.
WRAPPING MACHINE.
(Application filed Apr. 28, 1896.)
(No Model.) 9 Sheets—Sheet 3.
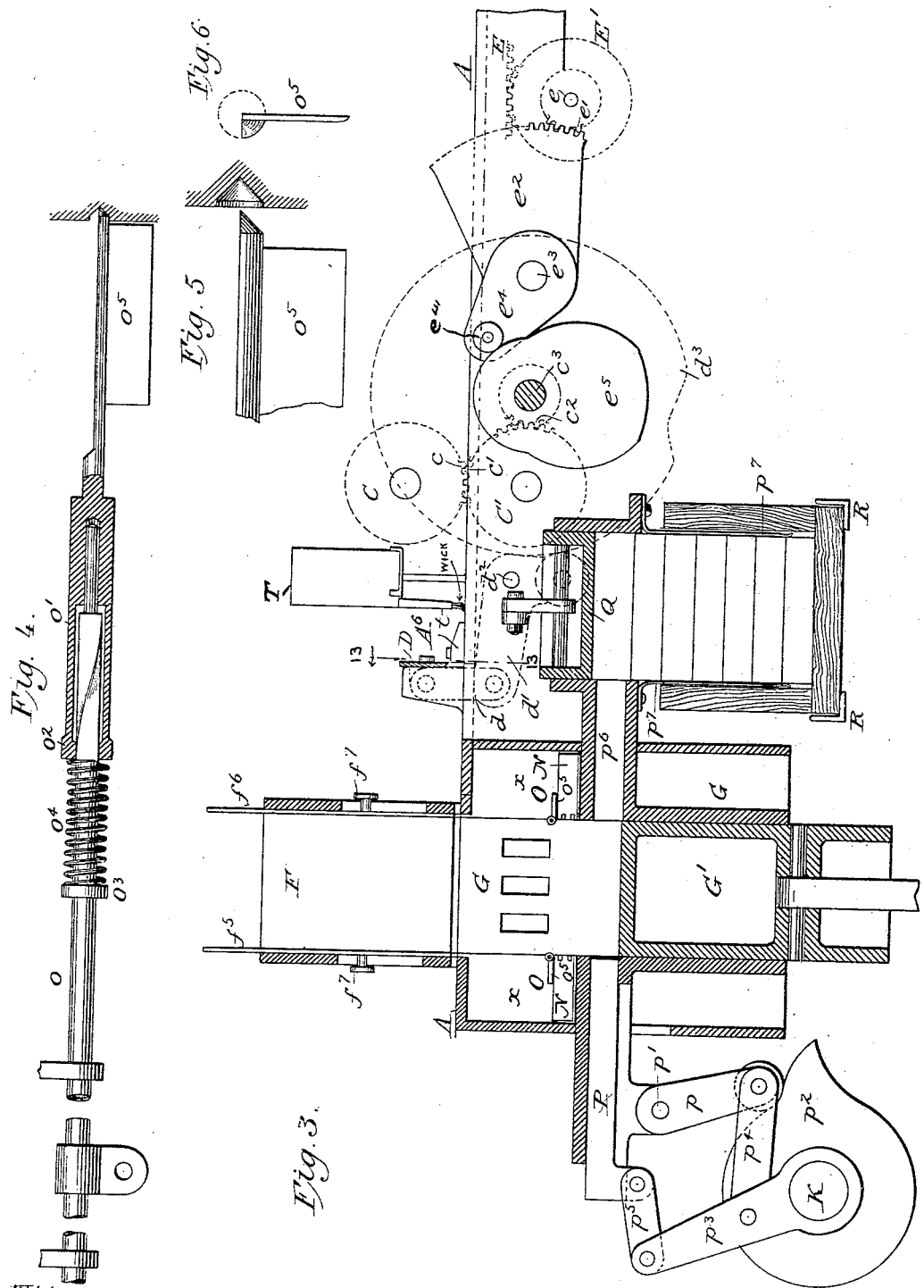

No. 620,637. Patented Mar. 7, 1899.
H. BOHLS.
WRAPPING MACHINE.
(Application filed Apr. 28, 1896.)
(No Model.) 9 Sheets—Sheet 4.
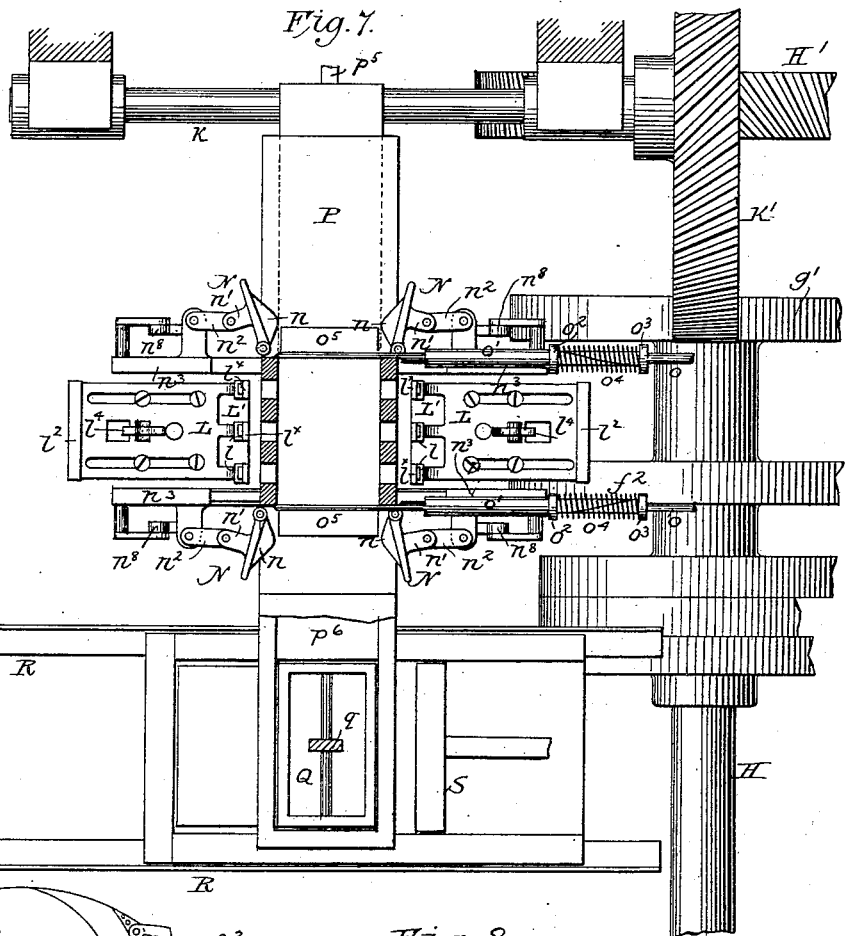
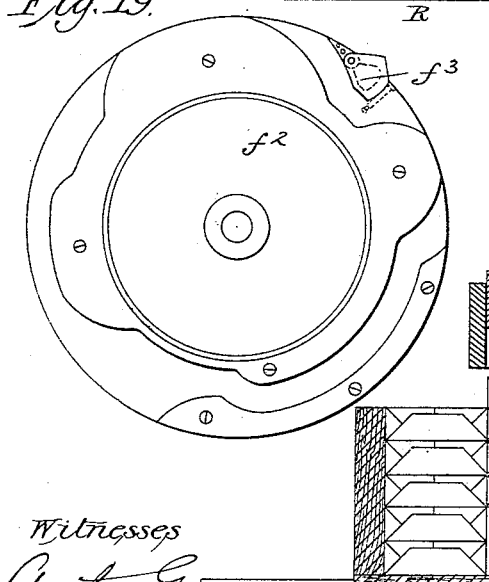
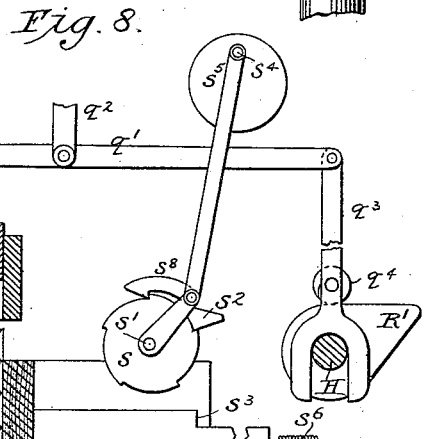
Witnesses Inventor;
Henry Bohls,

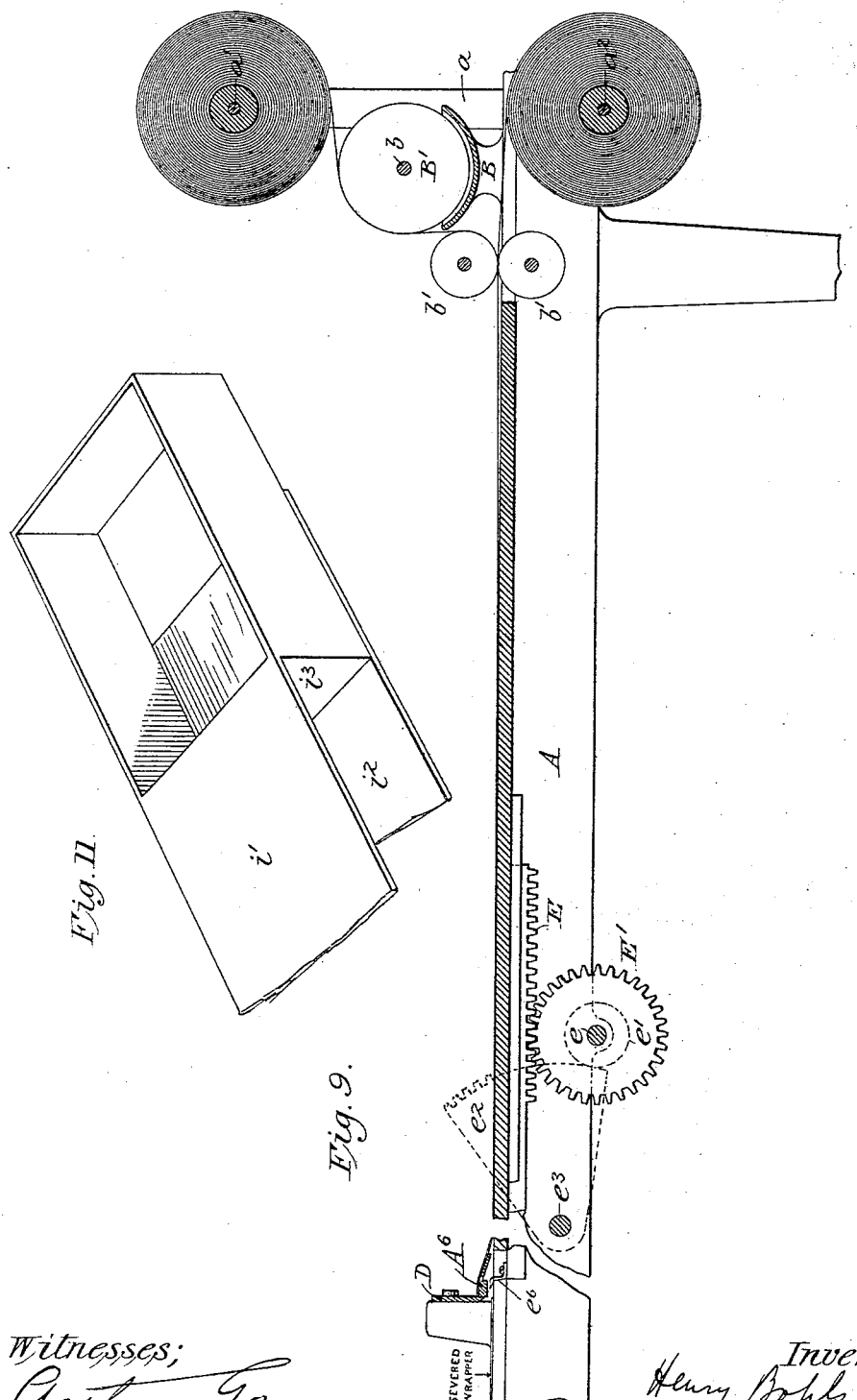

No. 620,637. Patented Mar. 7, 1899.
H. BOHLS.
WRAPPING MACHINE.
(Application filed Apr. 28, 1896.)
(No Model.) 9 Sheets—Sheet 6.
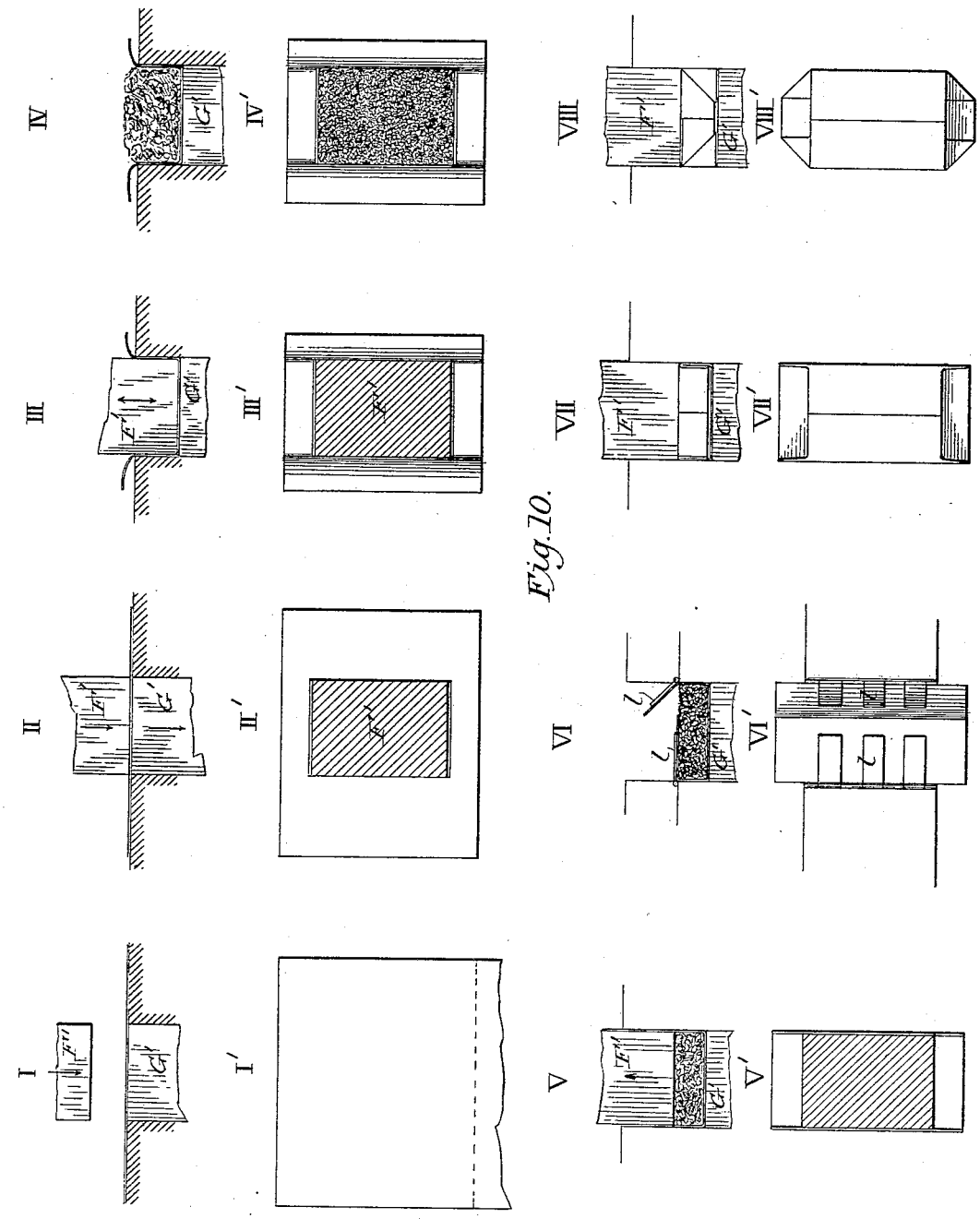
Fig. 10.
Witnesses: 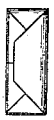  Inventor:

No. 620,637. Patented Mar. 7, 1899.
H. BOHLS.
WRAPPING MACHINE.
(Application filed Apr. 28, 1896.)
(No Model.) 9 Sheets—Sheet 7.
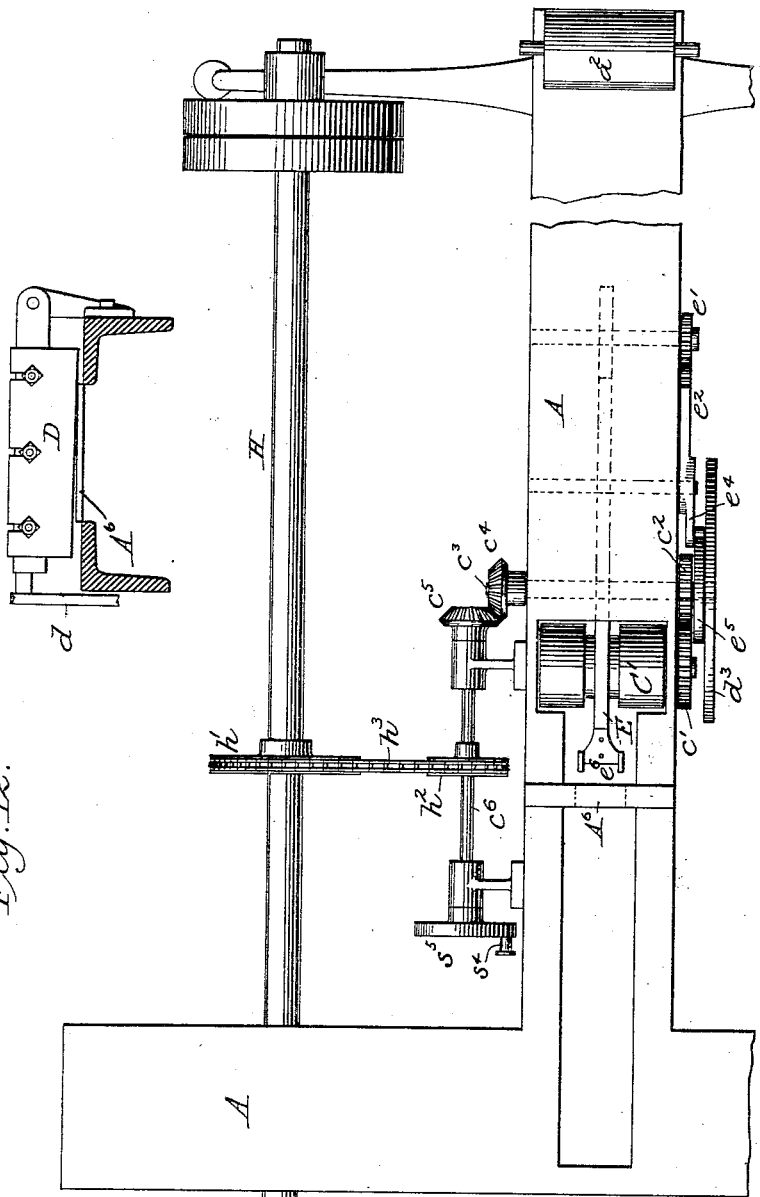
Witnesses:
Inventor:
Henry Bohls, No. 620,637. Patented Mar. 7, 1899.
H. BOHLS.
WRAPPING MACHINE.
(Application filed Apr. 28, 1896.)
(No Model.) 9 Sheets—Sheet 8.

Witnesses:

Inventor:
Henry Bohls,

No. 620,637. Patented Mar. 7, 1899.
H. BOHLS.
WRAPPING MACHINE.
(Application filed Apr. 28, 1896.)
(No Model.) 9 Sheets—Sheet 9.
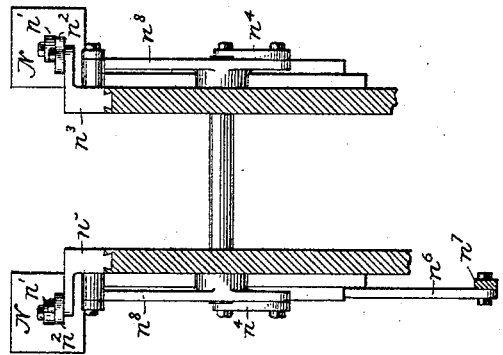
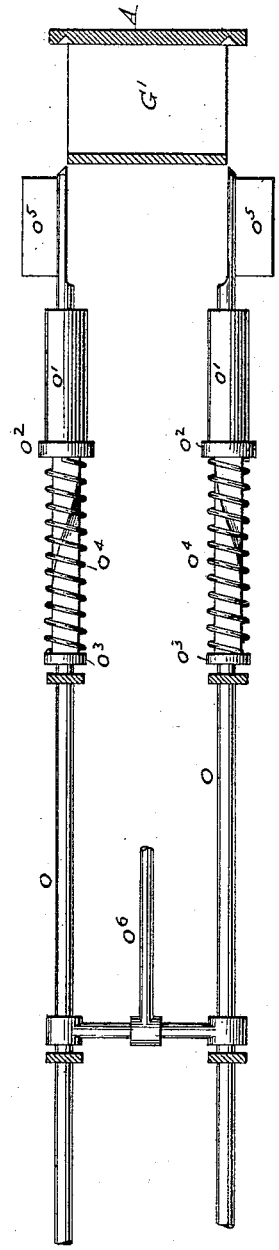

UNITED STATES PATENT OFFICE.

HENRY BOHLS, OF SAN FRANCISCO, CALIFORNIA, ASSIGNOR TO THE ECONOMY PACKING MACHINE COMPANY, OF NEW JERSEY.

WRAPPING-MACHINE.

SPECIFICATION forming part of Letters Patent No. 620,637, dated March 7, 1899.

Application filed April 28, 1896. Serial No. 589,448. (No model.)

*To all whom it may concern:*

Be it known that I, HENRY BOHLS, a citizen of the United States, residing at San Francisco, in the county of San Francisco and State of California, have invented certain new and useful Improvements in Packing and Wrapping Machines for Fibrous, Granular, or other Materials, of which the following is a specification, reference being had to the accompanying drawings and the letters marked thereon.

My invention relates to the class of wrapping-machines in which material is inclosed in wrappers, folded, and formed in the process of packing and wrapping into uniform packages; and it consists in the novel construction, arrangement, and combination of the several parts hereinafter fully described and specifically claimed.

The object of my invention is to provide a machine for this purpose which shall be effective and rapid in its operation, which shall not only pack and wrap, but also dispose the finished packages in orderly arrangement in suitable packing-cases, whereby its capacity and general usefulness are materially increased, resulting in marked economy.

Figure 1:
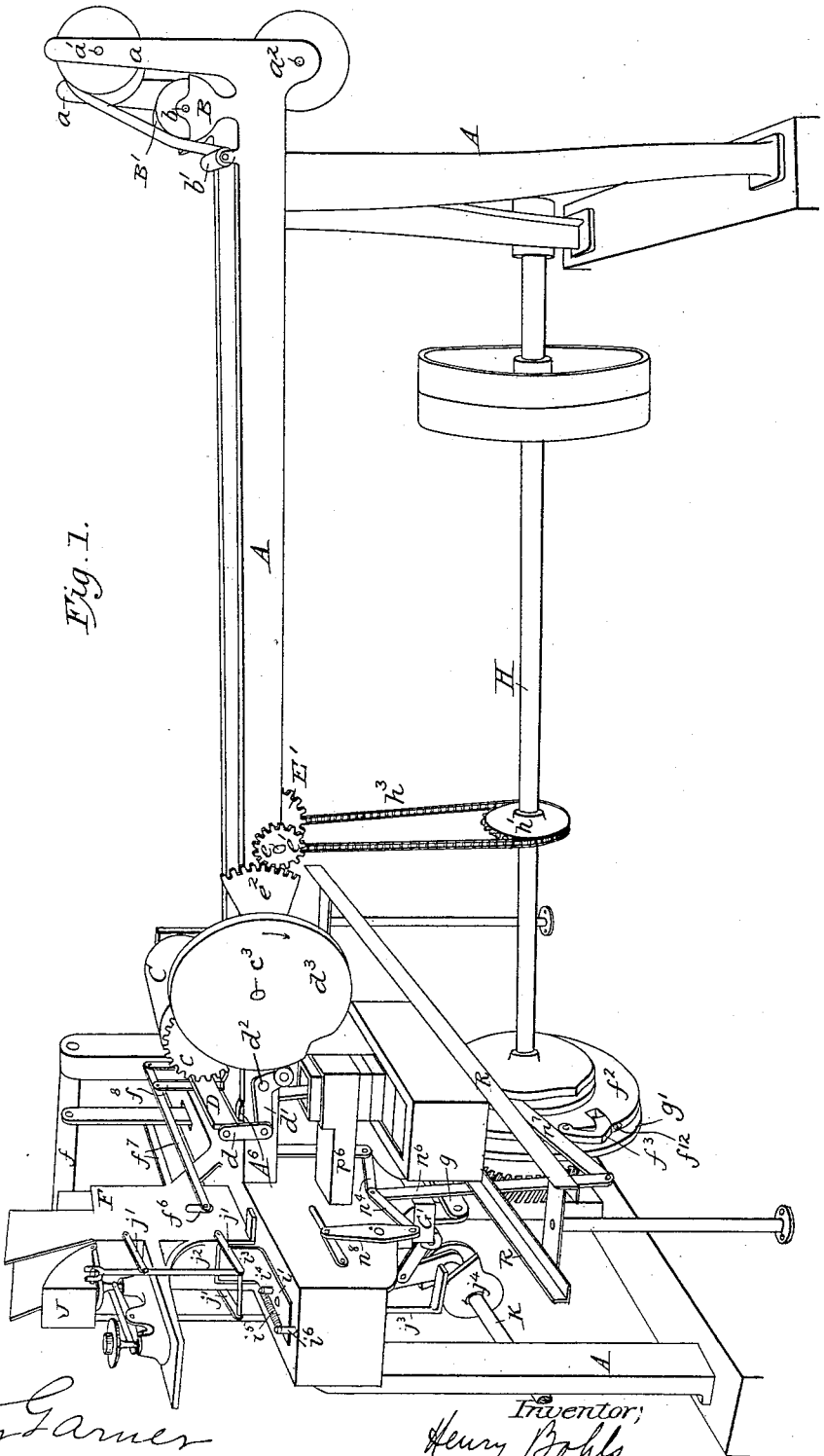
Figure 2:
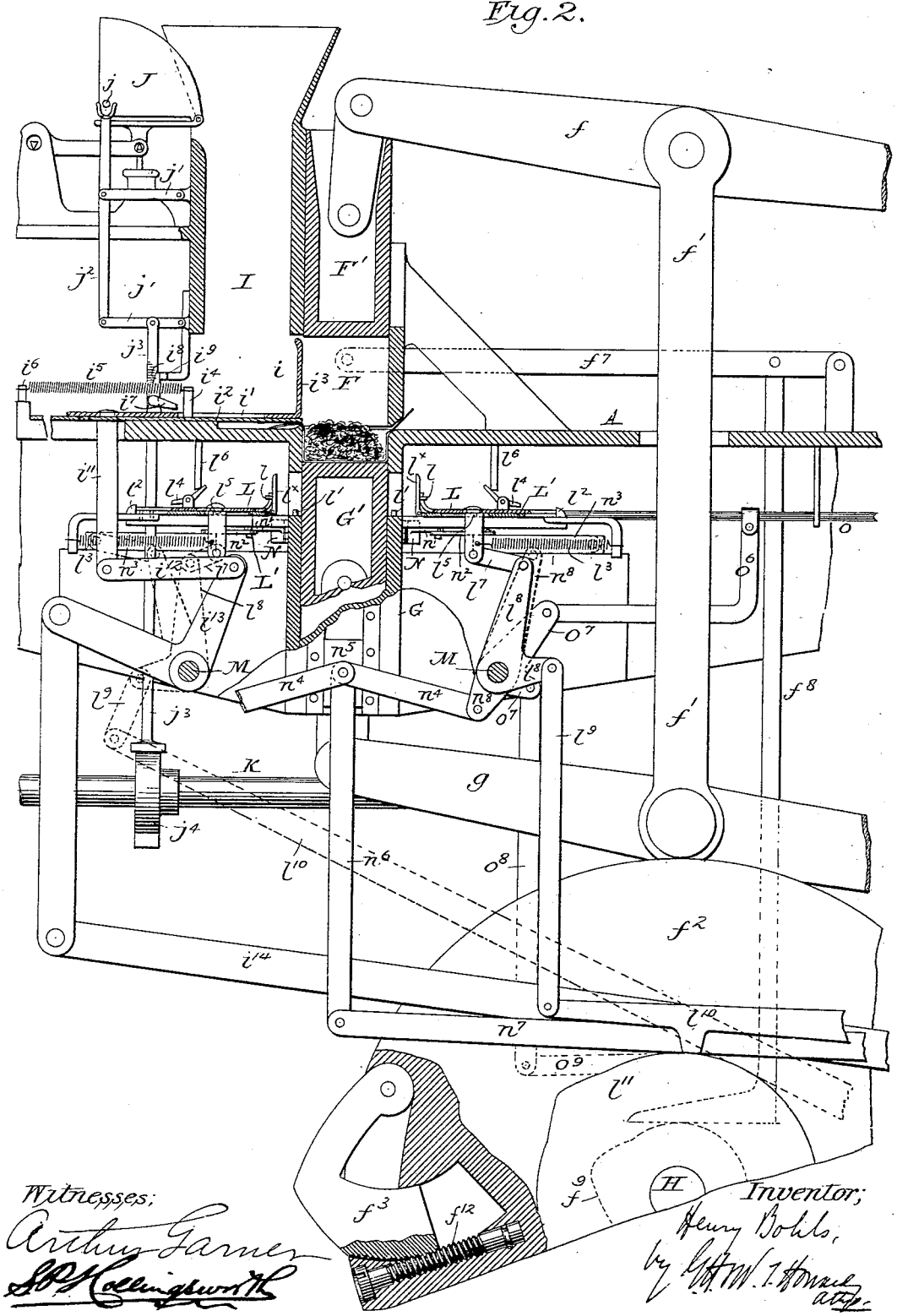
Figure 14:
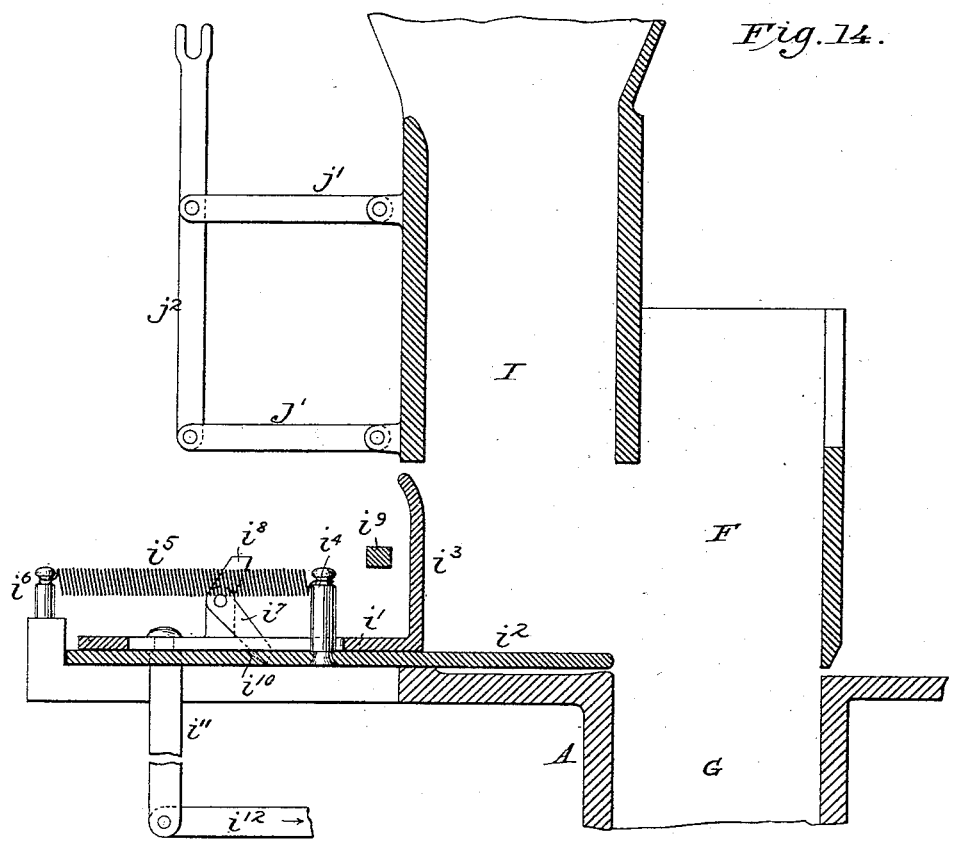
Figure 15:
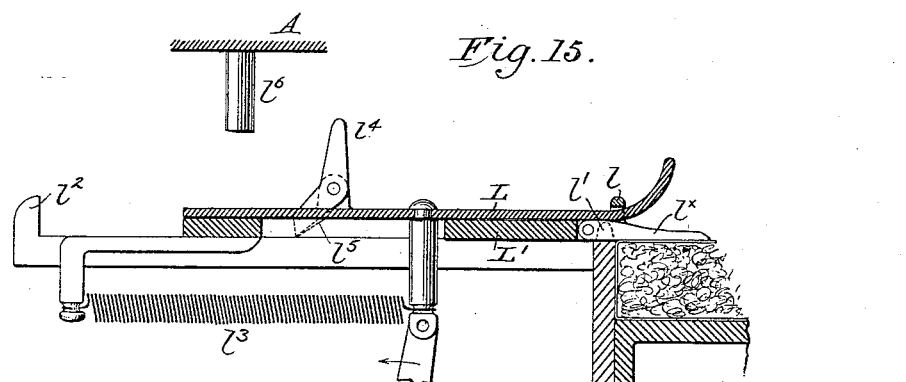

Referring to the accompanying drawings, Figure 1 is a general perspective view of the principal parts of the machine, some of the minor parts being omitted for the advantage of clearness. Fig. 2 is a cross-section through the plunger-chamber. Fig. 3 is a longitudinal section of the plunger-chamber end of the machine. Fig. 4 is an enlarged view of the first-fold end-folder, a portion of which is in section. Fig. 5 is an enlarged detail of Fig. 4. Fig. 6 is an end view of Fig. 5. Fig. 7 is a plan section through line $x$ $x$ of Fig. 3. Fig. 8 is a detail showing the package-arranging device. Fig. 9 is a longitudinal section of the wrapper-roll end of the machine. Fig. 10 is a diagrammatic series showing the various stages in process of wrapping and packing. The diagrams marked I II III IV V, &c., are end views of the wrapper and contents, and the diagrams marked I' II' III' IV' V', &c., are plan views of the corresponding parts of the series. Fig. 11 is a perspective view of a modification of the device for feeding the loose material to the wrapper. Fig. 12 is a plan view of the general driving mechanism of the machine. Fig. 13 is a cross-section of the main frame on the line 13 13, Fig. 3. Fig. 14 is a cross-section, on an enlarged scale, through the plunger-chamber, showing the material-feeding device in position to receive material. Fig. 15 is a cross-section, on an enlarged scale, of one of the first-fold folders, showing the device in the position of having completed the fold. Fig. 16 is a plan view of the first end-folders drawn back after completing their operation. Fig. 17 is an elevation of the second end-folders and means for operating them. Fig. 18 is a view at right angles to Fig. 17. Fig. 19 is a detail of one of the cams.

Described in general terms, the machine comprises continuous-roll wrapper-feeding devices and means whereby the continuous wrapper-sheet is measured, cut off in suitable length for one package, and fed into position to receive the material to be wrapped; means for separating definite amounts of material from the bulk and depositing it upon the wrapper; devices for forming the wrapper around the material and inclosing the material in a neat and uniform package, together with means adapted to assemble and arrange in systematic order the finished packages in suitable cases.

The frame A, Fig. 1, which forms the general supporting structure of the machine, is provided with uprights $a$, having suitable bearings $a'$ and $a^2$, which support the rolls of wrapping material. Two of such are shown. Intermediate of these roll-bearings and also supported upon the frame A is a trough or receptacle B, provided with bearings $b$, in which is journaled a shaft, upon which is secured a number of disks B', these partly immersing themselves in the trough B. Forward of this trough B are two rollers $b'$ $b'$, journaled in the frame A, set one above the other with their axes parallel to each other and to the disk-shaft $b$ and wrapper-rolls. At some distance forward of these rollers $b'$ $b'$ is another set of rolls C C', placed in the same relative position to each other as those $b'$ $b'$. These rolls C C' are suitably journaled in the frame A and provided with gears $c$ $c'$, one on each axle, which mesh with each other. The gear $c'$ meshes into a pinion $c^2$, secured upon a short shaft $c^3$, journaled in and extending across the frame A of the machine. A miter-pinion $c^4$, secured to the shaft $c^3$, meshes with the second miter-gear $c^5$ on a horizontal shaft $c^6$, journaled in brackets extending from the frame. (See Fig. 12.) This shaft $c^6$ carries a sprocket-wheel $h^2$, which is driven by a chain $h^3$ from a sprocket-wheel $h'$, secured to the main shaft H, thus transmitting a continuous rotary motion to the rolls C C'.

At a short distance forward of the rolls C C' is located a vertically-reciprocating knife D, hinged to the frame at one end, Fig. 13, its other end being connected by a suitable link connection $d$ to one arm of a bell-crank lever $d'$, which is loosely pivoted upon a pin $d^2$, secured in the frame A. The other arm of the bell-crank $d'$ is provided with a friction-roller adapted to roll upon the periphery of a cam-disk $d^3$, secured upon a shaft $c^3$, journaled in the frame A, the periphery of the cam-disk $d^3$ being of suitable contour to operate the bell-crank lever, whereby vertical movement is given to knife D in one direction. A spring or weight (not shown) or any other well-known means can be used to move the knife in the opposite direction. A plate $A^6$, extending across the main frame A and bolted or otherwise fastened thereto, is adapted to coact with the knife D to sever the wrapper, as shown in Figs. 3, 9, 12, and 13.

Beneath the upper surface of the frame A, in suitable guides, is a rack-bar E, Figs. 3, 9, and 12, which engages with a gear-wheel $E'$, secured upon a shaft $e$, journaled in the frame A. Upon this shaft $e$ is also secured a toothed pinion $e'$, which meshes with a segmetal gear $e^2$, attached to a shaft $e^3$, journaled in the frame A. Secured upon this shaft is also a short lever-arm $e^4$, provided with a friction-roller $e^{41}$. Upon the shaft $c^3$ is attached a cam $e^5$ of suitable contour, adapted to engage with and operate the lever-arm $e^4$. Upon the forward end of the rack-bar E is secured a light flexible and upwardly-projecting forked extension $e^6$.

Beyond the knife-blade is located a vertical rectangular guide F, whose lower edge is slightly above the surface of the frame A. A lower extension G of this rectangular guide or plunger chamber continues downwardly from the surface of the frame A. In the upper portion of this guide F is located a movable plunger or presser $F'$, connected with the driving mechanism of the machine by a suitable rock-arm $f$, connecting-rod $f'$, and cam $f^2$, secured upon the main driving-shaft H of the machine, whereby the plunger $F'$ receives vertical reciprocating motion of suitable character and amount. In the lower portion of the guide-chamber G is a similar plunger or presser $G'$, Figs. 1, 2, and 3, also operated by the driving mechanism by a suitable rock-arm $g$ and cam $g'$, secured upon the main shaft H. To one side of this rectangular guide-chamber F is another chamber I, (shown in Fig. 2,) opening into the guide-chamber F at $i$. The upper side of the supplementary chamber I is furnished with a three-sided rectangular flaring mouth or funnel. The fourth or vacant side of the funnel-shaped top is supplied by the bottom plate of the scales-tray, arranged in the following manner: Suitable weighing-scales are secured adjacent to the vacant side of the funnel-shaped top, and an appropriate tray J is hinged to the platen of the scales, the pivot of the hinge connection being located near the upper edge of the chamber I, projecting slightly within its rim. One side, near the rear portion of the tray J, is provided with a projecting pin $j$.

Attached to the side of the wall of the chamber I on the outside, by means of hinged parallel arms $j'\ j'$, is a vertical rod $j^2$, forked at its upper end, the forked portion embracing without touching the pin $j$ on the tray. Loosely connected to the lower parallel arm is a downwardly-extending rod $j^3$, adapted to engage with a suitable cam $j^4$ upon the shaft K, which shaft is driven from the main shaft H by means of the spiral gears $K'\ H'$, secured to the respective shafts, Figs. 7 and 12. At the lower extremity of the chamber I is provided a charging or feeding device comprising a false or movable bottom of two plates $i'\ i^2$, adapted to slide one upon the other and both to move upon the permanent bottom of the chamber I. The upper plate $i'$ is provided with an upwardly-bent portion $i^3$, which is adapted to close the chamber-opening. The lower plate $i^2$ is provided with a vertical pin $i^4$ and coil-spring $i^5$, attached thereto, its other end being secured to a stationary portion of the frame at $i^6$. The upper plate is also provided with a hinged pawl $i^7$, having a tappet end $i^8$. A stop $i^9$ is suitably located to engage with the tappet of the pawl. In the lower plate is a notch $i^{10}$ to receive the point of the pawl $i^7$. Extending downwardly from the upper plate is a suitable attachment-bar $i^{11}$, connected by a link $i^{12}$ to the bell-crank lever $i^{13}$, the other end of which is loosely attached to a lever-arm $i^{14}$, which engages with a suitable cam secured upon the main shaft of the machine. All this is clearly shown in Fig. 2.

Located below and on a plane parallel to the feeding device is a first-fold wrapper-folder. This consists of two superimposed plates L L' somewhat similar to the feeding device. The lower plate L', a short distance back of its front edge, is hinged. The upper plate L at its front edge is bent upwardly, the bent portion passing beneath a strap or guide $l$. Stops $l'\ l^2$ are provided to limit the forward and backward movements of the plate L'. The lower plate is connected to the upper plate by a coil-spring $l^3$, and pivoted on the upper plate is a pawl $l^4$, adapted to engage with a notch $l^5$ in the lower plate. This pawl $l^4$ is provided with an extension beyond the pivotal point adapted to engage with a suitable stop or tappet $l^6$. To operate this folder, the connecting-link $l^7$, rock-arm $l^8$, pivoted upon the shaft M, connecting-rod $l^9$, and lever-arm $l^{10}$, are actuated by the cam $l^{11}$ on the main driving-shaft H. Directly opposite this folder and on the same plane is another folder of similar construction, in conjunction with which it works, Fig. 2.

Located on a line with the first-fold folder are the first end-folders. (Shown in position in Figs. 2, 3, and 16 and in detail in Figs. 4, 5, and 6.) There are two of these folders O O, set parallel and on the same plane to each other. They are set at right angles to the length of the machine. As both are alike, with the exception of being right and left handed, respectively, a description of one will serve for both.

Fig. 4 is an enlarged detail of one of the folders. It consists, as will be seen by reference to the figure, of a rod $o$, loosely guided in suitable brackets attached to the frame. One end is provided with an external sleeve $o'$, having a guide $o^2$, in which is a square end opening, fitting the end of the rod $o$, which is also made square for this purpose. This square end is given a quarter-twist. At some distance back of the square end is a collar $o^3$ on the rod $o$, and between the end of the sleeve and the collar is a coiled spring $o^4$ around the rod. Continuing from the free end of the sleeve is an extension of the rod reduced to a quadrant in section. (Shown clearly in Figs. 4, 5, and 16 and particularly in Fig. 6.) To one of the radial sides of this quadrant is secured a flat plate $o^5$. (Shown in the same figures.) The end of the quadrant section-rod is pointed to the center of the circle of which it is a quadrant. To operate the rod $o$, the angular rod $o^6$ connects the rod $o$ with the rock-arm $o^7$, pivoted on the shaft M, which is attached to the lever-arm $o^9$ by the connecting-rod $o^8$. $o^9$ engages with and is operated by a suitable cam on the main shaft H. Directly opposite and concentric with the rod $o$ is a conical hole in the frame A for the reception of the pointed end of the quadrant section-rod.

A short distance below the last-described folder is located a duplex second end-folder. (Shown in Figs. 7, 17, and 18.) This folder consists of four hinged wings N N N N, one located on each end of the side wall of the rectangular guide-chamber. The four hinged wings are in all respects similar and operate in the same manner, each side pair being directly connected to work together and each end pair also deriving their motion from the same connection. The four wings therefore may be considered a unit made up of four like elements, and a description of one will thus suffice for all four. The wing consists of a plate vertically hinged at one end. On its lower edge it is provided with a projecting plate $n$. At right angles to its vertical side the free edge of this plate $n$ is curved, as shown in Fig. 7. Projecting from the back of the wing is a lug $n'$, to which is loosely connected a link $n^2$, forming a connection to a sliding bar $n^3$, suitably guided in the frame A. This sliding bar is suitably connected through the rock-arm $n^8$ on the shaft M, link $n^4$, sliding block $n^5$, connecting-rod $n^6$, and lever $n^7$ to an operating-cam upon the main shaft H to be operated thereby.

A plunger P for discharging the completed package from the rectangular guide-chamber G is placed below the lower edge of the wing-folders N a distance equal to or slightly in excess of the thickness of a package. The plunger is suitably guided to reciprocate horizontally through the guide-chamber G, carrying the completed package therefrom, as shown in Fig. 3.

To reciprocate the plunger P, the rock-arm $p$ is hinged to the frame A at $p'$ and is at its lower end provided with a friction-roller, which engages with a suitable cam $p^2$ upon the cross-shaft K. Loosely pivoted upon the same shaft is a rock-arm $p^3$, attached at its upper end to the plunger P by means of a connecting-link $p^5$. Intermediate its ends the rock-arm $p^3$ is connected by a link $p^4$ with the end of the depending rock-arm $p$.

Forming a continuation of the discharging-plunger guide and extending outwardly from the rectangular main plunger-chamber is a passage $p^6$ of suitable sectional area and form to receive and contain two finished packages abutting endwise. The top and bottom walls of the outer end of the passage $p^6$ are absent for a space equal to and of like shape to the corresponding sides of a finished package. Around the edges of the upper of these openings extend upwardly side walls, forming a short rectangular guide, in which is located a vertically-movable plunger Q. A link $q$ connects the plunger Q to a rocking lever $q'$, pivoted at $q^2$ to a bracket extending from the main frame. (See Fig. 8.) From the opposite end of the arm $q'$ extends downwardly an arm $q^3$, forked to embrace the main shaft H, by which it is guided. A cam R' on the shaft H engages with an antifriction-roller $q^4$ on the arm $q^3$. As the cam rotates the plunger Q is caused to rise and fall in the passage $p^6$. Depending from the front and back edges of this opening in the passage $p^6$ are flexible spring sides $p^7 p^7$.

Extending across the machine some distance below the spring sides $p^7$ are horizontal tracks or ways R, adapted to receive suitable packing-cases. (Shown in Figs. 1, 3, and 8.) Each packing-case, as shown in Figs. 7 and 8, is made, preferably, of wood with a bottom, two sides, and one end, the top and the remaining end being left open, the former for the introduction of the packages into the case, while through the latter reciprocates a plunger S for advancing the packing-case, as hereinafter described.

Centrally guided between and a little above the tracks R is located a horizontally-movable plunger S, Fig. 8. To actuate this plunger, a ratchet-wheel $s$ is employed, furnished with a desired number of teeth. This ratchet-wheel is secured upon a shaft $s'$, set crosswise of the shank of the plunger S. Corresponding to one of the ratchet teeth or notches is a projecting tooth $s^2$, adapted to engage with a notch or tappet $s^3$ on the shank of the plunger S. The ratchet-pawl $s^8$ is loosely attached to an arm journaled on the shaft $s'$ and connected, by means of a rod, to the crank $s^4$ on the disk $s^5$, which is suitably secured to the shaft $c^6$, Fig. 12, to receive rotary motion therefrom in equal time with one complete cycle of the machine. To return the plunger S after forward motion, the spring $s^6$ is attached to the end of the plunger-shank, its other end being secured to a stationary part of the frame A.

Upon the upper surface of the table portion of the frame A and located in front of the forward feed-rolls C is a suitable receptacle T for adhesive fluid. This receptacle is provided with a depending spout $t$, ending in close proximity to and slightly above the edge of the traveling wrapper material. In the spout is a wick or other suitable device adapted to distribute the adhesive fluid upon the wrapper material.

On both sides of the plunger F are wrapper-creasing and temporary end-closing plates $f^5$ $f^6$, Fig. 3, adapted to slide vertically and connected by the rock-lever $f^7$ and cam-rod $f^8$ with a cam $f^9$ upon the main shaft H to be operated thereby. (See Fig. 2.)

The mode of operation of this machine is as follows: The material to be packed having been placed on the hinged scoop or tray of the scales and the main shaft H set in motion the shaft K, with its cam $j^4$, is rotated, thereby causing the forked arm $j^2$ to move upward, so as to engage with the pin $j$ of the hinged tray J, thus raising the free end of the tray and discharging by gravity its contents into the supplementary chamber I upon the lower plate $i^2$, Fig. 14, of the false bottom, the upper plate $i'$, with its upwardly-turned front edge, having previously been drawn back slightly beyond the line of the rear wall of the chamber I, of which the portion $i^3$ of the plate now forms a continuation. Meanwhile the feed-rollers C C by their rotation have drawn the upper and lower wrapper material from their respective rolls, the upper wrapper passing over and in contact with the disks B', receiving therefrom adhesive fluid from the trough B, in which the disks are slightly immersed. Passing from the disks between the rolls $b'$ the upper and lower sheets of the wrapper are pressed into contact, thus causing their adhesion one to the other, from which point onward the two wrapping materials form one united compound wrap. Owing to the mechanical arrangement before described, from which they derive rotation, the feed-rolls C rotate sufficiently to feed forward a suitable length of wrapper material to serve for one package, incidentally causing its edge to pass beneath and in contact with the depending wick of the adhesive-fluid receptacle T. The proper length having passed beneath the knife-blade D, the cam $d^3$, by which the blade is functioned, comes into operation, causing it to descend and thus sever the length from the continuous wrapper-strip. The severed portion of wrapper falls slightly and in front of the upwardly-projecting feed-finger $e^6$, which now (owing to its engagement with its cam $e^5$ through the described transmitting mechanism) moves forward sufficiently to convey the severed wrapper beneath the upper rectangular guide-chamber F and its contained plunger F', the lower plunger G' having meanwhile assumed a position in which its upper surface is on a line with the surface of the table and immediately beneath the wrapper. The upper plunger now descends upon the wrapper, which is gripped between the upper and lower plunger. Both plungers now descend together, carrying the wrapper downward and forming it into a flattened U shape. The upper plunger then rises to above the opening of communication $i$ between the plunger-chamber and the supplementary feed-chamber. The side plates $f^5 f^6$ also descend upon the wrapper with the upper plunger, and by the pressure of their thin lower edge crease or score the wrapper preparatory to the last end fold. When the plunger rises, these plates remain down, acting as temporary end-closing devices to the U shape of the wrappers, and forming therewith a completely-walled chamber. The wrapper is now in position to receive the charge of material. This charge is also in position, as before described, upon the false bottom of the supplementary chamber. The plate $i^2$, constituting the false bottom of the feed-chamber, together with the upper plate $i'$, moves toward the plunger-chamber, plate $i^2$ passing therein. The lower plate having reached its extreme position, the tappet end of the hinge-pawl $i^7$ engages with the stop $i^9$, thereby releasing the lower plate from engagement with the pawl. It immediately snaps back even with the upper plate, as shown in Fig. 2, thus depositing the material by gravity into the U-shaped wrapper. The upper plunger once more descends on the top of the material, thereby compressing it to the requisite thickness. The amount of compression to which the material is subjected is dependent upon the character of the material. The means employed in regulating the amount of pressure is the adjustable character of the contour of the cams $f^3$. (See Figs. 2 and 19.) As there shown, the adjustable cam-block $f^3$ is pivoted to the disk $f^2$ on the shaft H. A projection $f^{15}$ extends laterally from the cam-block $f^3$, beneath which a roller pivoted to the lower end of the connecting-rod $f'$ passes and by which the roller is depressed more or less to vary the pressure exerted by the plunger on the material to be packed. The means for varying the pressure consists of a screw $f^{12}$, let into the disk $f^2$ in such a manner as to permit free rotation thereof, but hold it against endwise movement. The cam-block $f^3$ has a thread on one edge concentric with its pivot, which is engaged by the screw $f^{12}$. By turning the screw to the right or left the cam-block $f^3$ is raised or lowered, thus causing the plunger F' through its connections to exert more or less pressure on the material to be packed. Both plungers now descend until the material is level with the first main folders, when the upper plunger F' and the side plates $f^5 f^6$ ascend. The wrapper, with its partly-inclosed contents, is now ready for further wrapping, which is accomplished by the inward motion of the hinged folder. Its first motion is to move in its entirety until the hinge of the lower plate reaches the edge of the plunger-chamber, at which point the stop $l'$ arrests the forward motion of the lower plate L'. The upper plate L continuing its forward journey, the curved front portion of the upper plate passes over the hinge, thereby causing the hinge portion of the lower plate L' to assume a horizontal position, thus folding the upper extension of the wrapper and causing it to lie down upon and infold the material, the corresponding folder on the opposite side of the plunger-chamber meanwhile going through and performing precisely the same motions and functions, but later in point of time, so avoiding a conflict of the free ends of the wrapper. The first side-fold folders having performed their functions immediately withdraw, the movement being accomplished as follows: Near the latter end of the inward movement of the upper plate the pawl $l^4$ engages with the notch $l^5$ in the lower plate L'. The first backward movement of the upper plate L carries with it the lower plate L', both plates moving in unison, the hinged portion $l^\times$ remaining in its horizontal position until the upper portion of the pawl $l^4$ engages with the tappet $l^6$. This arrests the backward movement of the pawl $l^4$, but causes it to turn on its pivot, thereby disengaging the lower plate from the upper one. The spring $l^3$, connecting the two plates, as heretofore stated, immediately contracts, causing the plates L and L' to move relatively in opposite directions, which, through the curved end of the plate L and the strap $l$, causes the hinged portion $l^\times$ to be raised to its vertical position. The upper plunger now descends upon the package, pressing together the free ends of the wrapper, which, as before described, having been furnished with adhesive fluid on one of the edges are thereby secured. The first end-folder now comes into operation, its first motion being a longitudinal advance across the machine until its center point enters the conical hole in the frame. This arrests the advance of the plate $o^5$; but the main bar or rod $o$ still continues its motion of advance. The spirally-formed or twisted end slides into the sleeve $o'$ and by its engagement with the snugly-fitting end $o^2$ of the sleeve causes a quarter-rotation of the wing, thus producing the first end fold of the wrapper, which it turns directly at a right angle downward. The plate $o^5$ immediately reverses its movement by the retreat of the actuating-rod $o$; but still retaining its position in the conical hole, owing to the compressed condition of the spring $o^4$, until the spring has been released entirely from compression, the whole device is carried back to its original position. The action of one first end-folder is simultaneously duplicated by the other end-folder on the opposite end of the package. These folders having performed their functions and retired, the duplex second end-folders now come into operation, all four of the hinge-wing components N N N N swinging inwardly upon the package, thereby folding the side extension of the wrapper around each corner of the package. The curved projecting plates $n\ n\ n\ n$ on these wings serve to cause a more acute folding of the side fold, which they do by tucking the wrapper under the material, and thus overcome the natural elasticity and spring of the wrapper, which would otherwise tend to undo the effect of these folders, for the wrapper at these points is now of double thickness, or, taking into account the compound character of the wrapper, as described, fourfold. The package is now complete, with the exception of the last fold, which is accomplished by the downward motion simultaneously of both upper and lower plungers, thereby carrying the package farther down the rectangular chamber, thus bending upward the last fold by contact with the edge of the chamber. The plunger P now moves forward, thereby discharging the completed package into the passage $p^6$.

It will be observed that the motions of the upper and lower plunger are dissimilar in speed and distance of travel in the upward and downward journey of one cycle. During their upward motion, though traveling in the same direction simultaneously, the upper plunger has to travel a greater distance than the lower plunger. This differential motion in relation to each other is produced by a suitable contour of cams $f^2$ and $g^2$, by which they are actuated. The differential movement of the upper and lower plunger performs important functions, one of which is that of giving a U shape to the wrapper deeper than the thickness of the finished package, thus providing sufficient depth in the U-shaped wrapper to contain the loose, unpressed, and consequently bulky material. Another still more important function in the practical working of this class of machines is the great saving of time brought about by the increased rapidity of the upper plunger. This will be easily understood if consideration is had to the fact that were the upper plunger to move at the same speed as the lower plunger all the functions of the machine would be delayed during the time required for it to traverse the much greater distance of its journey. In the particular instance of this machine the difference in speed of the plungers is utilized in feeding the paper into position.

The cycle of motions described is repeated until another package is formed behind the one already completed, and a second forward motion of the plunger P forces both packages forward, the first package to the end of the passage $p^6$, directly beneath the plunger Q, which now descends upon the first completed package, forcing it downward between the spring sides $p^7 p^7$. This operation is repeated until the ratchet-wheel $s$ has made a complete revolution, the number of teeth in this ratchet-wheel determining the number of packages which will compose the vertical series between the spring sides. Having made a full revolution, the projecting tooth $s^2$ upon the ratchet-wheel will now engage with the notch $s^3$ on the stem of the horizontal plunger S, thus causing it to move forward and discharge simultaneously the whole vertical series of packages into the case placed upon the tracks or guideways to receive them. This cycle having been repeated, another vertical series of packages is forced out by the horizontal plunger S, projecting forward the previously-discharged series and containing-case. Thus the operation is renewed until the case is filled, when it is removed and an empty one substituted and the whole cycle repeated indefinitely.

When it is desired to operate the machine without the weighing-scales, the plate $i'$ of the false bottom is provided with four vertical sides instead of the one $i^3$ and a backwardly-projecting cut-off plate. The chamber I then becomes a receptacle or bin for material in bulk, from the bottom of which the movable bottom receptacle takes a charge at each forward stroke. This modification is shown in Fig. 11, the machine otherwise remaining and operating as described.

Having now described my invention, what I claim as new, and wish to secure by Letters Patent, is—

1. The combination, with mechanism for feeding a wrapper, of mechanism for delivering a charge of loose material, a fixed mold, and mechanisms for forming the wrapper into U shape, pressing said material to a predetermined solid form, and wrapping the charge of material while the charge is in said fixed mold, substantially as set forth.

2. The combination, with mechanism for feeding a wrapper, of mechanism for delivering a charge of loose material, a fixed mold, mechanism embodying differentially-movable plungers within the fixed mold, and operative for forming the wrapper into U shape and for pressing said material to a predetermined solid form, and mechanism for wrapping the charge of material while the charge is in said mold, substantially as set forth.

3. The combination, with mechanism for feeding a continuous wrapper-strip and severing wrapper-sheets, and mechanism for forming the wrapper-sheets into U shape within a fixed mold, of weighing mechanism, coöperative with the several other mechanisms, for automatically delivering predetermined quantities of material into the U-shaped wrapper-sheets, and mechanism for forming the wrapper-sheets into packages around the charges, substantially as set forth.

4. The combination, with mechanism for feeding a continuous wrapper-strip and severing wrapper-sheets, and mechanism for forming the wrapper-sheets into U shape within a fixed mold, of weighing mechanism, coöperative with the several other mechanisms, for automatically delivering predetermined quantities of material to the U-shaped wrapper, and mechanisms for compressing said charges to a predetermined solid form and forming the wrappers into packages around said charges, substantially as set forth.

5. In a packing-machine, the combination, with mechanism for feeding wrappers and material, of coacting plungers for partially shaping the wrappers prior to the delivery of charges thereto, mechanism for afterward completing the shaping of each wrapper into a package around the material and means for temporarily closing one end of the partially-shaped package during the delivery of material thereto and while the sheet is held by the wrapper-shaping mechanism, substantially as set forth.

6. In a packing-machine, the combination, with mechanism for feeding wrappers and material, of coacting plungers for partially shaping the wrappers prior to the delivery of charges thereto, mechanism for afterward completing the shaping of each wrapper into a package around the material, means for temporarily closing one end of the partially-shaped package during the delivery of material thereto, and means for discharging the finished package, substantially as set forth.

7. In a packing-machine, the combination, with mechanism for feeding wrappers and material, of coacting plungers for first forming a wrapper-sheet into U shape, having an open side and open ends, mechanism for afterward completing the shaping of the wrapper into a package around the material, and means for temporarily closing both open ends of the partially-shaped package during the delivery of material thereto, substantially as set forth.

8. In a packing-machine, the combination, with mechanism for feeding a continuous wrapper-strip and for severing wrapper-sheets therefrom, of coacting plungers for first partially shaping the wrapper, mechanism for afterward finishing the shaping of the wrapper into a package around a charge of material, means for automatically feeding a predetermined quantity of loose material to the partially-finished wrapper within which the loose material is compressed to a predetermined solid form, and mechanism for forming the finished packages into uniform series, substantially as set forth.

9. In a packing-machine, the combination, with molding and wrapping mechanism for compressing a charge and for forming a wrapper into a package around the charge, said mechanism embodying a fixed mold and two movable plungers, and coacting mechanism for arranging the packages in uniform series, substantially as set forth.

10. In a packing-machine, the combination, with a fixed mold and with means for feeding an unfolded wrapper to the mold, of coacting plungers for carrying the wrapper into position in the mold, and mechanism for feeding a charge of material upon the wrapper within the mold and pressing it therein, substantially as set forth.

11. In a packing-machine, the combination, with a mold having two movable sides, of mechanism for feeding a wrapper and material to the mold, a folding member operative for folding one edge of the wrapper into the position upon the material occupied by one of the movable sides, and mechanism for operating said movable side and the folding member, substantially as set forth.

12. The combination, with a fixed mold, of mechanism for partially shaping a wrapper within said mold to form a chamber having an open side and open ends, sliding plates to temporarily close the open ends of the chamber, mechanism for delivering to the partially-formed wrapper a predetermined charge of material, side-folding means for closing the open side of the wrapper, and separate end-folding devices for folding the ends of the wrapper, substantially as set forth.

13. The combination, with means for feeding a plurality of wrappers simultaneously, of pasting mechanism for pasting said wrapper together to form a composite wrapper, means for forming the composite wrapper into U shape, mechanism for delivering a predetermined charge of loose material to the U-shaped wrapper, mechanism for pressing the material into predetermined solid form within the wrapper, and wrapping mechanism for forming the composite wrapper into a package around the charge, substantially as set forth.

14. The combination, with means for feeding a plurality of continuous wrapper-strips simultaneously, of mechanism for pasting said strips together to form a composite wrapper-strip, mechanism for severing the composite wrapper-strip into wrapper-sheets, mechanism for delivering a predetermined charge of loose material, mechanism for compressing the charge to the predetermined form within the wrappers, and mechanism for forming the composite wrapper into a package around the charge, substantially as set forth.

15. The combination, with means for feeding a plurality of wrappers simultaneously, of mechanism for pasting said wrappers together to form a composite wrapper, mechanism for delivering a predetermined charge of loose material, and molding and wrapping mechanism for compressing within the composite wrapper said material to a predetermined solid form and for shaping the wrapper into a package around the charge, substantially as set forth.

16. A machine comprising means adapted to separate wrappers from continuous rolls and form them into U shape, means for automatically feeding equal quantities of material to the previously-formed U-shaped wrappers, means whereby the U-shaped wrappers are closed around the said materials into packages, and means whereby said packages are collected and formed into uniform series, and said series are arranged within suitable cases, substantially as set forth.

17. A packing-machine comprising means whereby the material packed constitutes the core or former around which previously-formed U-shaped wrappers are finished into packages, automatic means whereby said packages are arranged in uniform series and said series are uniformly arranged in previously-formed cases, substantially as set forth.

18. A packing-machine comprising means adapted to continuously feed wrapper-strips, means adapted to measure and sever from the continuous strips a suitable length for a package, means adapted to feed the severed wrapper into position to receive its contents, an upper and a lower plunger between which the wrapper is fed, the upper plunger moving differentially with respect to the lower one both as to distance and direction, and means in connection with said plungers whereby material to be inclosed in said wrapper is deposited thereupon and inclosed thereby when the wrapper is between the plungers, substantially as set forth.

19. In a packing-machine, means for forming compound wrappers of two or more continuous webs of suitable material, devices adapted to apply adhesive substance thereto and feed the said wrappers into position to be operated upon, devices adapted to separate uniform amounts of material and feed it upon the wrapper, an upper and a lower plunger, moving differentially with respect to each other both as to distance and direction, between which the wrapper and the material to be packed are fed, formed and finished, devices, used conjointly with the upper and lower plungers, whereby the wrapper is formed and finished around the material into a package, and means adapted to arrange the packages in uniform series, substantially as set forth.

20. In a packing-machine, a device adapted to feed wrappers between independently-moving plungers, means for operating the plungers to form the wrappers into U shape, a device adapted to feed a predetermined amount of material on the previously-shaped wrapper, and devices adapted to close the wrapper around the material, in combination with a device adapted to discharge the finished package from between the plungers, substantially as set forth.

21. In a packing-machine, an upper and a lower differentially-moving plunger within a guide-chamber between which a wrapper is fed, means whereby the wrapper is formed into U shape prior to the reception of the material to be inclosed thereby, and means adapted to temporarily close the open ends of the U-shaped wrapper, to form an inclosed chamber open at the top, in combination with means adapted to feed material into the inclosed chamber formed of the wrapper, and end-closing devices, substantially as set forth.

22. In a packing-machine, an upper and a lower plunger between which wrappers are fed, means whereby the wrapper is formed into U shape prior to the reception of material to be inclosed thereby, means adapted to close the open ends of the U-shaped wrapper temporarily, to form an inclosed chamber open at the top, and means adapted to feed the material into the inclosed chamber formed of the wrapper and end-closing devices, in combination with devices adapted to form and finish the package between the plungers and discharge it therefrom, substantially as set forth.

23. In a packing-machine, an upper and a lower plunger, and mechanism for forming and finishing the package between the plungers, in combination with means adapted to arrange the finished packages in uniform series and arrange said series uniformly in suitable packing-cases, substantially as set forth.

24. In a packing-machine, the combination of an upper and a lower plunger in a rectangular guide-chamber, automatic means adapted to separate uniform amounts of material from bulk and feed said separated amounts to a wrapper, and mechanism adapted to infold in the wrapper the material between the plungers in a neat and uniform closed package, substantially as set forth.

25. In a packing-machine, automatic means for forming wrappers and material into inclosed packages, in combination with an automatic material-feeding device, comprising an upper and a lower plate adapted to slide one upon the other and both in suitable guides, the bottom plate adapted to carry a charge of material resting thereon into position, and the upper plate adapted to discharge said material from the lower plate as the latter is retracted, the plates being suitably connected to the driving mechanism to be operated thereby, substantially as set forth.

26. In a packing-machine, automatic means for forming wrappers and materials into inclosed packages, in combination with an automatic material-feeding device, comprising a plate $i'$, with its upwardly-bent portion $i^3$ and a pawl $i^7$ with a suitable releasing device, a lower plate $i^2$ provided with means adapted to engage with and be driven by the pawl $i^7$, and a spring connecting the plate $i^2$ with a stationary portion of the frame, said plates $i'$ and $i^2$ being suitably connected with the driving mechanism of the machine, to be operated at proper intervals, substantially as set forth.

27. A feeding device, comprising two reciprocating plates, one of which is driven positively in both directions of its reciprocation, and the other driven positively in one direction by said first plate and returned by power stored up by the motion of the first plate in the opposite direction, in combination with automatic means for forming wrappers and materials into packages, substantially as set forth.

28. In a packing-machine, a wrapper-folder comprising two reciprocating plates, one of which is driven positively in both directions of its reciprocation, and the other driven positively in one direction by the first plate, and in the other direction by an elastic connection with the same plate, substantially as set forth.

29. In a packing-machine, a folder comprising a coarse-pitch screw provided with a shank extension, suitably connected with the driving mechanism of the machine, whereby it receives longitudinal motion, a nut loosely mounted on said screw having a radial wing, and a spring between said nut and a collar on the shank, said shank being guided in the frame of the machine, and a stop on the main frame concentrically located with the nut and adapted to limit its forward motion, substantially as set forth.

30. In a packing-machine, a hinged folder N, provided with a tucking device $n$ projecting forward from its lower edge, substantially as set forth.

In testimony whereof I have hereunto set my hand and seal this 27th day of March, 1896.

HENRY BOHLS. [L. S.]

Witnesses:
 L. SONNTAG,
 JOHN GERDTS.